United States Patent
Gore et al.

(10) Patent No.: US 7,189,767 B2
(45) Date of Patent: Mar. 13, 2007

(54) COLORANTS, DISPERSANTS, DISPERSIONS, AND INKS

(75) Inventors: Robert Howard Gore, Southampton, PA (US); Eric Jon Langenmayr, Bryn Mawr, PA (US); Warren Harvey Machleder, Blue Bell, PA (US); Dennis Paul Lorah, Lansdale, PA (US); Antony Keith Van Dyk, Blue Bell, PA (US); Newman Mayer Bortnick, Sarasota, FL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/097,257

(22) Filed: Mar. 15, 2002

(65) Prior Publication Data

US 2003/0055178 A1 Mar. 20, 2003

Related U.S. Application Data

(60) Provisional application No. 60/280,420, filed on Mar. 30, 2001.

(51) Int. Cl.
*C09D 11/10* (2006.01)
*C09D 11/16* (2006.01)

(52) U.S. Cl. ....................... 523/160; 523/161
(58) Field of Classification Search ................ 524/804; 525/335; 523/160, 161
See application file for complete search history.

(56) References Cited

U.S. PATENT DOCUMENTS

| | | | | |
|---|---|---|---|---|
| 3,945,965 A | * | 3/1976 | Ramig et al. ................ 523/218 |
| 4,487,855 A | * | 12/1984 | Shih et al. ................... 523/201 |
| 4,543,383 A | * | 9/1985 | Heil et al. ................... 524/458 |
| 4,954,556 A | * | 9/1990 | Bull et al. .................... 524/378 |
| 5,540,981 A | * | 7/1996 | Gallagher et al. ........... 428/220 |
| 5,679,138 A | * | 10/1997 | Bishop et al. ............ 106/31.75 |
| 6,028,135 A | * | 2/2000 | Keller et al. ................. 524/458 |
| 6,177,088 B1 | * | 1/2001 | Guo et al. .................... 424/400 |
| 6,214,467 B1 | * | 4/2001 | Edwards et al. ............. 428/407 |
| 6,268,222 B1 | * | 7/2001 | Chandler et al. ............ 436/523 |
| 6,323,257 B1 | | 11/2001 | Moffatt et al. ............... 523/160 |
| 6,329,446 B1 | * | 12/2001 | Sacripante et al. .......... 523/161 |
| 6,465,556 B1 | * | 10/2002 | Pratt et al. ................... 524/457 |
| 6,586,097 B1 | * | 7/2003 | Pascault et al. ............. 428/402 |
| 2003/0232914 A1 | * | 12/2003 | Devonport et al. ......... 524/501 |
| 2003/0232918 A1 | * | 12/2003 | Amick et al. ................ 524/539 |

FOREIGN PATENT DOCUMENTS

| | | |
|---|---|---|
| EP | 0 303 803 B1 | 6/1994 |
| EP | 0 921 166 B1 | 4/2003 |
| WO | WO 93/00376 | 1/1993 |
| WO | WO 93/24534 | 12/1993 |
| WO | WO 93/24534 A1 * | 12/1993 |
| WO | WO 00/59951 A1 * | 10/2000 |
| WO | WO 02/28660 A2 | 4/2002 |

* cited by examiner

*Primary Examiner*—David W. Wu
*Assistant Examiner*—Rip A. Lee

(57) ABSTRACT

Colorant, dispersants, dispersions, and inks are provided which include crosslinked polymeric nanoparticles (hereafter "PNPs") having a mean diameter in the range of from 1 to 50 nanometers, the PNPs including as polymerized units at least one multi-ethylenically-unsaturated monomer. Also provided are methods for preparing colorants, dispersants, dispersions, and inks which include PNPs.

1 Claim, No Drawings

COLORANTS, DISPERSANTS, DISPERSIONS, AND INKS

CROSS REFERENCE TO RELATED PATENT APPLICATIONS

This is a non-provisional application of prior pending U.S. provisional application Ser. No. 60/280,420 filed Mar. 30, 2001.

This invention relates to colorants, dispersants, dispersions, and inks. In particular, this invention relates to a colorant, dispersant, dispersion, and ink including crosslinked polymeric nanoparticles (hereinafter "PNPs") having a mean diameter in the range of from 1 to 50 nanometers. This invention also relates to methods for preparing colorants, dispersants, dispersions, and inks.

By "colorant" herein is meant a substance that interacts with radiation, e.g., pigments and dyes.

By "interacts with radiation" herein is meant the scattering or altering of radiation, such as electromagnetic radiation, such as visible light, by a substance.

By "chromophore", herein is meant a chemical unit which alters electromagnetic radiation such as by absorption, phosphorescence, or fluorescence.

By "particle" and "particulate" is meant a finely divided substance.

By "pigment" herein is meant a colorant in the form of a particulate organic or inorganic substance. Within the purview of this invention, inorganic particles include, but are not limited to, particulate minerals, clays, ceramics, metals, and the like.

By "dye" herein is meant a colorant in the form of non-particulate organic or inorganic substance, e.g., a molecule containing a chromophore.

By "dispersion" herein is a liquid dispersion of finely dispersed particles useful in a number of applications including: polymer lattices for inks, paints, plastics, and coatings; colorant dispersions, e.g., pigment dispersions, for inks, paints, plastics, and coatings; ceramic dispersions; metallic particle dispersions; and mineral dispersions (e.g., clay dispersions for inhibiting scale, stabilized lime slurries, and stabilized dispersions of calcium carbonate).

By "dispersant" herein is meant a molecule in a particle dispersion useful for keeping the particles distributed through out the particle dispersion, e.g., to prevent aggregation, agglomeration, coagulation, flocculation, phase separation, and like processes, of the particles.

Many types of colorants can be dispersed in liquids including organic and inorganic pigment particles and dyes. However, many colorants, such as organic pigments, are often provided as large (e.g., greater than 100 micron) powdery agglomerates of aggregates of primary pigment particles. Unfortunately, the color quality of materials incorporating dispersions of large powdery colorant agglomerates is often poor. Accordingly, many colorants require the extensive input of energy, e.g., through grinding and milling, and require the use of specific dispersants to prepare dispersions of smaller colorant particles, such as primary pigment particles, for use in materials having improved color quality. While dyes are generally more dispersible than pigments, many dyes tend to fade on exposure to heat, light, and radiation (poor light fastness). Many dyes also tend to migrate (i.e., "bleed"). While organic pigments typically have better light fastness and migrate less compared to dyes, they typically are difficult to disperse as described above. Improved colorants are sought.

Particle dispersions are inherently unstable. Particle dispersions tend to require an effective dispersant to prevent the particles from coagulating. Examples of suitable dispersants are anionic, cationic, and nonionic surfactants and polymeric dispersants. Surfactants as dispersants suffer from having dynamic mobility between the particle surface and the continuous phase, which can result in irreversible coagulation upon the approach of two particles. Their effectiveness as dispersants can also be adversely affected by the presence of water miscible organic solvents present in the dispersion. Polymeric dispersants attach to the particle surface at multiple points so that they are not susceptible to some of the failure modes of surfactants. They also can stabilize by both charge and steric stabilization. However, even polymeric dispersants can be adversely affected by the presence of various organic additives, which can cause collapse of the stabilizing polymer chains or desorption of the polymeric dispersant from the particle surface. Improved dispersants and dispersions are sought.

Dispersed polymers such as emulsion polymers are widely used as binders in a variety of inks. Emulsion polymers as components of ink formulations used in ink jet printers are useful to impart beneficial properties to printed products. Properties such as water fastness, highlighter resistance, wet rub resistance, dry rub resistance, and substrate adhesion can all be enhanced by choice of a suitable binder. However, the presence of latex binders in an ink formulation tends to severely degrade the ink performance in the printhead. The presence of latex binders in ink formulations can result in printer performance degradation by many different modes. For example, thermal ink jet printheads have resistive heater elements that can reach temperatures of 300° C., or higher. Latex binders can degrade at these temperatures, which can foul the heater elements, and can form a film on the heater surface. These problems can change the degree of thermal energy imparted to the ink and cause poor print performance. Under these conditions, latex binders can also coagulate by themselves, or coagulate with dispersed pigments, if present. Such coagulation can reduce printing performance by causing changes in the physical properties of the ink such as viscosity or surface tension or by physically clogging the nozzles of the printhead. In the printhead, conditions of high shear exist due to the high frequency of ink ejection through the printhead and the small dimensions of the printhead. Such conditions of high shear can also cause coagulation of the latex binder with itself, coagulation of the latex binder with dispersed pigment, or adsorbtion of the latex binder on the surface of the printhead interior. The conditions of high shear are present not only in thermal printheads but also in other types of ink jet printheads as well as in piezoelectric printheads. Improved inks are sought.

The present invention seeks to provide colorants that overcome the aforementioned problems. These problems are overcome by providing new colorants in which the size, morphology, dispersibility, and stability of the colorant is improved. The present invention also seeks to provide dispersants that do not suffer from the failings of the dispersants noted above. The present invention also seeks to provide dispersions, particularly colorant dispersions, that have improved stability. The present invention also seeks to provide inks, particularly ink jet inks, with improved properties.

It has now been found that many of the aforementioned problems can be overcome by including PNPs in the compositions of colorants, dispersants, dispersions, and inks. The PNPs which are useful have a mean diameter in the range of from 1 to 50 nanometers, and have as polymerized units at least one multi-ethylenically-unsaturated monomer.

The dispersions provided herein are particularly useful in that their viscosities are reduced using the PNP dispersants of the present invention compared to using non-PNP dispersants.

The colorants of the present invention contain PNPs having a mean diameter in the range of from 1 to 50 nanometers, the PNPs containing as polymerized units at least one multi-ethylenically unsaturated monomer, and chromophores that are included on, are included within, or are physically or chemically associated with the PNPs. The PNPs enable the colorants of the present invention to have improved particle size control and morphology control over current colorants, such as pigments. The colorants of the present invention can be used is various applications, for example, in inks, coatings, and plastics.

In a first aspect of the present invention there is provided colorant, comprising: at least one chromophore and PNPs having a mean diameter in the range of from 1 to 50 nanometers, said PNPs comprising as polymerized units at least one multi-ethylenically-unsaturated monomer.

In a second aspect of the present invention there is provided a dispersion, comprising: particles and PNPs dispersed in a liquid medium, wherein said PNPs have a mean diameter in the range of from 1 to 50 nanometers, said PNPs comprising as polymerized units at least one multi-ethylenically-unsaturated monomer.

In a third aspect of the present invention there is provided an ink that includes the dispersions of the present invention.

In a fourth aspect of the present invention there is provided a dispersant, comprising: at least one PNP having a mean diameter in the range of from 1 to 50 nanometers, said PNP comprising as polymerized units at least one multi-ethylenically-unsaturated monomer.

In a fifth aspect of the present invention, there is provided a method for providing a colorant, comprising:

forming PNPs having a mean diameter in the range of from 1 to 50 nanometers, said PNPs comprising as polymerized units at least one multi-ethylenically-unsaturated monomer; and attaching at least one chromophore to at least a portion of said PNPs.

In a sixth aspect of the present invention, there is provided a method for providing a dispersion, comprising:

forming PNPs having a mean diameter in the range of from 1 to 50 nanometers, said PNPs comprising as polymerized units at least one multi-ethylenically-unsaturated monomer; and dispersing at least one particle with said PNPs in a liquid medium.

As used herein, the following abbreviations shall have the following meanings, unless the context clearly indicates otherwise: C=centigrade; μm=micron; UV=ultraviolet; rpm=revolutions per minute; nm=nanometer; J=joules; cc=cubic centimeter; g=gram; wt %=weight percent; L=liter; mL=milliliter; PVC=(Total volume of colorant)/(Total volume of colorant plus total volume of all other nonvolatile ingredients); MIAK=methyl iso-amyl ketone; MIBK=methyl iso-butyl ketone; BA=butyl acrylate; AA=acrylic acid; MAA=methacrylic acid; PS=particle size=mean diameter; PMA=poly(methyl acrylate); CyHMA=cyclohexyl methacrylate; EG=ethylene glycol; DPG=dipropylene glycol; DEA=diethylene glycol ethyl ether acetate; BzA=benzyl acrylate; BzMA=benzyl methacrylate; MAPS=MATS=(trimethoxylsilyl)propyl methacrylate; PETTA=pentaerythritol tetra/triacrylate; PPG4000DMA=polypropyleneglycol 4000 dimethacrylate; OFPMA=octafluoropentyl methacrylate; DPEPA=dipentaerythritol pentaacrylate; TMSMA=trimethylsilyl methacrylate; MOPTSOMS=methacryloxypropylbis(trimethylsiloxy)methylsilane; MOPMDMOS=3-methacryloxypropylmethyldimethoxysilane; TAT=triallyl-1,3,5-triazine-2,4,6-(1H,3H,5H)-trione; IBOMA=isobornyl methacrylate; PGMEA=propyleneglycol monomethylether acetate; PEGMEMA475=poly(ethylene glycol methyl ether) methacrylate Mw=475; and PGDMA=propyleneglycol dimethacrylate.

The term "(meth)acrylic" includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups.

All ranges defined herein are inclusive and combinable.

Unless indicated otherwise, the use of the term "or" herein refers to the inclusive form of "or", e.g., the condition "A or B" is true when at least one of the following is satisfied: A is true; B is true; A and B are both true.

The present invention is directed to colorants, dispersants, dispersions, and inks which include PNPs having a mean diameter in the range of from 1 to 50 nanometers, the PNPs comprising as polymerized units at least one multi-ethylenically-unsaturated monomer.

The PNPs are formed by the free radical polymerization of at least one multi-ethylenically-unsaturated monomer. Typically, the PNPs contain at least 1% by weight based on the weight of the PNPs, of at least one polymerized multi-ethylenically-unsaturated monomer. Up to and including 100% polymerized multi-ethylenically-unsaturated monomer, based on the weight of the PNPs, can be effectively used in the PNPs of the present invention. It is preferred that the amount of polymerized multi-ethylenically-unsaturated monomer is from about 1% to about 80% based on the weight of the PNPs, more preferably from about 1% to about 60% based on the weight of the PNPs, and most preferably from 1% to 25% based on the weight of the PNPs.

Suitable multi-ethylenically-unsaturated monomers useful in the present invention include di-, tri-, tetra-, or higher multi-functional ethylenically unsaturated monomers such as, for example, trivinylbenzene, divinyltoluene, divinylpyridine, divinylnaphthalene and divinylxylene; and such as ethyleneglycol diacrylate, trimethylolpropane triacrylate, diethyleneglycol divinyl ether, trivinylcyclohexane, allyl methacrylate ("ALMA"), ethyleneglycol dimethacrylate ("EGDMA"), diethyleneglycol dimethacrylate ("DEGDMA"), propyleneglycol dimethacrylate, propyleneglycol diacrylate, trimethylolpropane trimethacrylate ("TMPTMA"), divinyl benzene ("DVB"), 2,2-dimethylpropane-1,3-diacrylate, 1,3-butylene glycol diacrylate, 1,3-butylene glycol dimethacrylate, 1,4-butanediol diacrylate, diethylene glycol diacrylate, diethylene glycol dimethacrylate, 1,6-hexanediol diacrylate, 1,6-hexanediol dimethacrylate, tripropylene glycol diacrylate, triethylene glycol dimethacrylate, tetraethylene glycol diacrylate, polyethylene glycol 200 diacrylate, tetraethylene glycol dimethacrylate, polyethylene glycol dimethacrylate, ethoxylated bisphenol A diacrylate, ethoxylated bisphenol A dimethacrylate, polyethylene glycol 600 dimethacrylate, poly(butanediol) diacrylate, pentaerythritol triacrylate, trimethylolpropane triethoxy triacrylate, glyceryl propoxy triacrylate, pentaerythritol tetraacrylate, pentaerythritol tetramethacrylate, dipentaerythritol monohydroxypentaacrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydro siloxane), poly(phenyl vinyl siloxane) and mixtures thereof.

Suitable ethylenically-unsaturated monomers which can be incorporated as copolymerized units in the PNP include, but are not limited to: (meth)acrylic acid, (meth)acrylamides, alkyl (meth)acrylates, alkenyl (meth)acrylates, aromatic (meth)acrylates, vinyl aromatic monomers, phosphorus-containing compounds such as phosphoethyl (meth)acrylate ("PEM"), vinyl acetates, nitrogen-containing compounds and their thio-analogs, maleate, mono- and dialkyl esters, maleic acid, fumarates, maleamates and their copolymers with vinylaromatics, vinyl ethers, vinyl sulfides, and substituted ethylene monomers.

Typically, the alkyl (meth)acrylates useful in the present invention are ($C_1$–$C_{24}$) alkyl (meth)acrylates. Suitable alkyl (meth)acrylates include, but are not limited to, "low cut" alkyl (meth)acrylates, "mid cut" alkyl (meth)acrylates and "high cut" alkyl (meth)acrylates.

"Low cut" alkyl (meth)acrylates are typically those where the alkyl group contains from 1 to 6 carbon atoms. Suitable low cut alkyl (meth)acrylates include, but are not limited to: methyl methacrylate ("MMA"), methyl acrylate, ethyl acrylate, propyl methacrylate, butyl methacrylate ("BMA"), butyl acrylate ("BA"), isobutyl methacrylate ("IBMA"), hexyl methacrylate, cyclohexyl methacrylate, cyclohexyl acrylate and mixtures thereof.

"Mid cut" alkyl (meth)acrylates are typically those where the alkyl group contains from 7 to 15 carbon atoms. Suitable mid cut alkyl (meth)acrylates include, but are not limited to: 2-ethylhexyl acrylate ("EHA"), 2-ethylhexyl methacrylate, octyl methacrylate, decyl methacrylate, isodecyl methacrylate ("IDMA", based on branched ($C_{10}$)alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and mixtures thereof. Useful mixtures include dodecyl-pentadecyl methacrylate ("DPMA"), a mixture of linear and branched isomers of dodecyl, tridecyl, tetradecyl and pentadecyl methacrylates; and lauryl-myristyl methacrylate ("LMA").

"High cut" alkyl (meth)acrylates are typically those where the alkyl group contains from 16 to 24 carbon atoms. Suitable high cut alkyl (meth)acrylates include, but are not limited to: hexadecyl methacrylate, heptadecyl methacrylate, octadecyl methacrylate, nonadecyl methacrylate, cosyl methacrylate, eicosyl methacrylate and mixtures thereof. Useful mixtures of high cut alkyl (meth)acrylates include, but are not limited to: cetyl-eicosyl methacrylate ("CEMA"), which is a mixture of hexadecyl, octadecyl, cosyl and eicosyl methacrylate; and cetyl-stearyl methacrylate ("SMA"), which is a mixture of hexadecyl and octadecyl methacrylate.

The mid-cut and high-cut alkyl (meth)acrylate monomers described above are generally prepared by standard esterification procedures using technical grades of long chain aliphatic alcohols, and these commercially available alcohols are mixtures of alcohols of varying chain lengths containing between 10 and 15 or 16 and 20 carbon atoms in the alkyl group. Examples of these alcohols are the various Ziegler catalyzed ALFOL alcohols from Vista Chemical (now Sasol) company, i.e., ALFOL 1618 and ALFOL 1620, Ziegler catalyzed various NEODOL alcohols from Shell Chemical Company, i.e. NEODOL 25L, and naturally derived alcohols such as Proctor & Gamble's TA-1618 and CO-1270. Consequently, for the purposes of this invention, alkyl (meth)acrylate is intended to include not only the individual alkyl (meth)acrylate product named, but also to include mixtures of the alkyl (meth)acrylates with a predominant amount of the particular alkyl (meth)acrylate named.

The alkyl (meth)acrylate monomers useful in the present invention can be a single monomer or a mixture having different numbers of carbon atoms in the alkyl portion. Also, the (meth)acrylamide and alkyl (meth)acrylate monomers useful in the present invention can optionally be substituted. Suitable optionally substituted (meth)acrylamide and alkyl (meth)acrylate monomers include, but are not limited to: hydroxy ($C_2$–$C_6$)alkyl (meth)acrylates, dialkylamino ($C_2$–$C_6$)-alkyl (meth)acrylates, dialkylamino($C_2$–$C_6$)alkyl (meth)acrylamides.

Useful substituted alkyl (meth)acrylate monomers are those with one or more hydroxyl groups in the alkyl radical, e.g., those where the hydroxyl group is found at the β-position (2-position) in the alkyl radical. Hydroxyalkyl (meth)acrylate monomers in which the substituted alkyl group is a ($C_2$–$C_6$)alkyl, branched or unbranched, are preferred. Suitable hydroxyalkyl (meth)acrylate monomers include, but are not limited to: 2-hydroxyethyl methacrylate ("HEMA"), 2-hydroxyethyl acrylate ("HEA"), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate, 2-hydroxybutyl acrylate and mixtures thereof. The preferred hydroxyalkyl (meth)acrylate monomers are HEMA, 1-methyl-2-hydroxyethyl methacrylate, 2-hydroxypropyl methacrylate and mixtures thereof. A mixture of the latter two monomers is commonly referred to as "hydroxypropyl methacrylate" or "HPMA."

Other substituted (meth)acrylate and (meth)acrylamide monomers useful in the present invention are those with a dialkylamino group or dialkylaminoalkyl group in the alkyl radical. Examples of such substituted (meth)acrylates and (meth)acrylamides include, but are not limited to: dimethylaminoethyl methacrylate, dimethylaminoethyl acrylate, N,N-dimethylaminoethyl methacrylamide, N,N-dimethylaminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-(1,1-dimethyl-3-oxobutyl) acrylamide, N-(1,3-diphenyl-1-ethyl-3-oxobutyl) acrylamide, N-(1-methyl-1-phenyl-3-oxobutyl) methacrylamide, and 2-hydroxyethyl acrylamide, N-methacrylamide of aminoethylethyleneurea, N-methacryloxyethyl morpholine, N-maleimide of dimethylaminopropylamine, and mixtures thereof.

Other substituted (meth)acrylate monomers useful in the present invention are silicon-containing monomers such as γ-propyl tri($C_1$–$C_6$)alkoxysilyl (meth)acrylate, γ-propyl tri($C_1$–$C_6$)alkylsilyl (meth)acrylate, γ-propyl di($C_1$–$C_6$)alkoxy ($C_1$–$C_6$)alkylsilyl (meth)acrylate, γ-propyl di($C_1$–$C_6$)alkyl ($C_1$–$C_6$)alkoxysilyl (meth)acrylate, vinyl tri($C_1$–$C_6$) alkoxysilyl (meth)acrylate, vinyl di($C_1$–$C_6$)alkoxy($C_1$–$C_6$) alkylsilyl (meth)acrylate, vinyl ($C_1$–$C_6$)alkoxydi($C_1$–$C_6$) alkylsilyl (meth)acrylate, vinyl tri($C_1$–$C_6$)alkylsilyl (meth) acrylate, and mixtures thereof.

The vinylaromatic monomers useful as unsaturated monomers in the present invention include, but are not limited to: styrene ("STY"), α-methylstyrene, vinyltoluene, p-methylstyrene, ethylvinylbenzene, vinylnaphthalene, vinylxylenes, and mixtures thereof. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$) alkyl, carb($C_1$–$C_{10}$)alkoxy, carboxy, amino, ($C_1$–$C_{10}$)alkylamino derivatives and the like.

The nitrogen-containing compounds and their thio-analogs useful as unsaturated monomers in the present invention include, but are not limited to: vinylpyridines such as 2-vinylpyridine or 4-vinylpyridine; lower alkyl ($C_1$–$C_8$) substituted N-vinylpyridines such as 2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine; methyl-substituted quinolines and isoquinolines; N-vinylcaprolactam; N-vinylbutyrolactam; N-vinylpyrrolidone; vinyl imidazole; N-vinylcarbazole; N-vinylsuccinimide; (meth)acrylonitrile; o-, m-, or p-aminostyrene; maleimide; N-vinyl-oxazolidone; N,N-dimethylaminoethylvinylether; ethyl-2-cyanoacrylate; vinylacetonitrile; N-vinylphthalimide; N-vinylpyrrolidones such as N-vinylthiopyrrolidone, 3 methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone and 3,4,5-trimethyl-1-vinylpyrrolidone; vinylpyrroles; vinylanilines; and vinylpiperidines.

The substituted ethylene monomers useful as unsaturated monomers in the present invention include, but are not limited to: allylic monomers, vinyl acetate, vinyl formamide, vinyl chloride, vinylbenzyl chloride ("VBC"), vinyl fluoride, vinyl bromide, vinylidene chloride, vinylidene fluoride and vinylidene bromide.

Various substituted vinyl monomers and functionalized vinyl monomers, which are useful for incorporating into PNPs for attaching various dye molecules, are also provided in U.S. Patent Application Publication US20020025994 A1.

The PNPs used in the present invention can be prepared by emulsion polymerization, suspension polymerization, non-aqueous dispersion polymerization, or solution polymerization. By "solution polymerization" herein is meant free radical addition polymerization in an aqueous or non-aqueous medium which is a solvent for the polymer. By "solvent for the polymer" herein is meant that the polymer absent crosslinking would be soluble in the polymerization medium, as can be predicted based on the solubility of a polymer made under the same conditions absent the crosslinking monomer for polymers containing less than about 20 wt. % multi-ethylenically unsaturated monomer or by selection of a polymerization medium based on solubility maps as disclosed herein.

The PNPs can be prepared in a non-aqueous solvent. Examples of such solvents include, but are not limited to: hydrocarbons, such as alkanes, fluorinated hydrocarbons, and aromatic hydrocarbons, ethers, ketones, esters, alcohols and mixtures thereof. Particularly suitable solvents include dodecane, mesitylene, xylenes, diphenyl ether, gamma-butyrolactone, ethyl acetate, ethyl lactate, propyleneglycol monomethyl ether acetate, caprolactone, 2-heptanone, methylisobutyl ketone, diisobutylketone, propyleneglycol monomethyl ether, decanol, and t-butanol.

The PNPs can be prepared by first charging a solvent heel or, alternatively, a mixture of solvent and some portion of the monomer(s) to a reaction vessel equipped with a stirrer, a thermometer and a reflux condenser. The monomer charge is typically composed of monomer(s), initiator and chain transfer agent, as appropriate. The solvent or solvent/monomer heel charge is heated with stirring under a nitrogen blanket to a temperature from about 55° C. to about 125° C. After the heel charge has reached a temperature sufficient to initiate polymerization, the monomer charge or balance of the monomer charge is added to the reaction vessel over a period of 15 minutes to 4 hours while maintaining the reaction at the desired reaction temperature. After completing the monomer mixture addition, additional initiator in solvent can be charged to the reaction and/or hold periods can be employed.

The PNPs can be prepared by emulsion polymerization. The emulsion polymers useful in the present invention are generally prepared by first charging water and some portion of the monomer emulsion to a reaction vessel equipped with a stirrer, a thermometer and a reflux condenser. Typically, the monomer emulsion is composed of monomer, surfactant, initiator, and chain transfer agent, as appropriate. The initial charge of monomer emulsion is added to a suitable reactor vessel that is heated with stirring under a nitrogen blanket to a temperature of from about 55° C. to about 125° C. After the seed charge has reached a temperature sufficient to initiate polymerization, the monomer emulsion or balance of the monomer emulsion is charged to the reaction vessel over a period of 15 minutes to 4 hours while maintaining the reaction at the desired reaction temperature. After completing the monomer emulsion addition, additional initiator can be charged to the reaction and/or hold periods can be employed.

In the alternative, the emulsion polymerization can be carried out in a batch process. In such a batch process, the emulsion polymers are prepared by charging water, monomer, surfactant, initiator and chain transfer agent, as appropriate, to a reaction vessel with stirring under a nitrogen blanket to form a monomer emulsion. The monomer emulsion is heated to a temperature of from about 55° C. to about 125° C. to carry out the polymerization. After completing the monomer emulsion addition, additional initiator can be charged to the reaction and/or hold periods can be employed.

Suitable PNPs include, for example: HEMA/DEGDMA, MMA/DEGDMA, MMA/MAPS/DEGDMA, MMA/MAPS/PETTA, MMA/MAPS/PPG4000DMA, MMA/MAPS/DPEPA, MAPS/DEGDMA, BA/DEGDMA, MMA/MAPS/TMPTMA, MMA/MAPS/DVB, STY/MAPS/DVB, BA/MAPS/DVB, BA/TMSMA/DVB, BA/MOPTSOMS/DVB, BA/MOPMDMOS/DVB, BA/MAPS/TAT, ALMA/DVB, IBOMA/MAPS/DVB, IBOA/MAPS/DVB, BA/DVB, BA/PGDMA, BA/ALMA, BA/TMPTMA, BA/DPEPA, EHA/DVB, EHA/ALMA, EHA/TMPTMA, EHA/DPEPA, STY/DVB, STY/ALMA, EHA/STY/ALMA, MMA/BA/ALMA, STY/MMA/DVB, MMA/butadiene/STY, MMA/EA/ALMA, BA/ALMA/MATS, STY/MATS/DVB, MMA/BA/MATS, STY/MMA/MATS/DVB, MMA/BA/MATS/ALMA, BzA/TMPTMA, BzA/DVB, IDMA/BzMA and MMA/ALMA/MATS.

Suitable PNPs containing units polymerized from acid monomers include: MMA/AA/TMPTA, MMA/MAA/TMPTA, MMA/AA/ALMA, BA/MMA/AA/TMPTA, BA/AA/TMPTA, MMA/2-EHA/AA/TMPTA, STY/MMA/AA/TMPTA, BA/STY/AA/TMPTA, STY/MMA/AA/AAEM/TMPTA, AA/TMPTA, AA/ALMA, MAA/TMPTA, MMA/PEM/TMPTA, and MMA/AA/PEM/TMPTA.

Suitable PNPs containing units polymerized from amine monomers (e.g., dimethylaminopropyl methacrylate ("DMAPMA") and dimethylaminoethyl methacrylate ("DMAEMA") include: MMA/DMAPMA/TMPTA, MMA/DMAEMA/TMPTA, MMA/DMAPMA/ALMA, BA/MMA/DMAEMA/TMPTA, BA/DMAPMA/TMPTA, MMA/2-

EHA/DMAEMA/TMPTA, STY/MMA/DMAPMA/ TMPTA, BA/STY/DMAEMA/TMPTA, STY/MMA/ DMAPMA/AAEM/TMPTA, DMAEMA/TMPTA, DMAPMA/ALMA, DMAEMA/TMPTA, MMA/ DMAPMA/TMPTA, and MMA/DMAEMA/PEM/TMPTA.

Control of particle size and distribution can be achieved by such methods as choice of solvent, choice of initiator, total solids level, amount and type of multi-functional monomer, type and amount of chain transfer agent, initiator level and reaction conditions. Particle sizes can be determined using standard dynamic light scattering techniques. Correlation functions can be converted to hydrodynamic sizes using LaPlace inversion methods, such as CONTIN.

Initiators useful in the free radical polymerization of the present invention include, for example, one or more of: peroxyesters, dialkylperoxides, alkylhydroperoxides, persulfates, azoinitiators, redox initiators and the like. Useful free radical initiators include, but are not limited to: benzoyl peroxide, t-butyl peroctoate, t-amyl peroxypivalate, cumene hydroperoxide, and azo compounds such as azoisobutylnitrile and 2,2'-azobis (2-methylbutanenitrile). It is preferred that the free radical initiator is t-amyl peroxypivalate. The amount of the free radical initiator is typically from 0.05 to 10% by weight based on the weight of total monomer.

Chain transfer reagents can optionally be used to prepare the polymers useful in the present invention. Suitable chain transfer agents include, for example: alkyl mercaptans such as dodecyl mercaptan, and aromatic hydrocarbons with activated hydrogens such as toluene.

The PNPs typically have an apparent GPC weight average molecular weight in the range of 500 to 1,000,000, preferably in the range of 1,000 to 900,000, more preferably in the range of from 2,000 to 800,000, even more preferably in the range of from 3,000 to 700,000, even further preferably from 4,000 to 600,000, even more further preferably from 5,000 to 500,000, substantially more preferably from 10,000 to 500,000 and most preferably in the range of 15,000 to 100,000. As used herein, "apparent weight average molecular weight" reflects the size of the PNP particles. The GPC elution times of the PNPs thereby provide an indication of an apparent weight average molecular weight measurement, and not necessarily an absolute weight average molecular weight measurement. As used herein, the term "molecular weight", when describing the PNPs, refers to the apparent molecular weight one obtains using standard gel permeation chromatography methods, e.g., using THF solvent at 40C, 3 Plgel Columns (Polymer Labs), 100 Angstrom, 10^3, 10^4 Angstroms, 30 cm long, 7.8 mm ID, 1 mil/min, 100 microliter injection volume, calibrated to narrow polystyrene standards using Polymer Labs CALIBRE™ software.

In the various embodiments of the present invention, unless indicated otherwise, the PNPs have a mean diameter in the range of from 1 to 50 nm, preferably in the range of from 1 to 40 nm, more preferably in the range of from 1 to 30 nm, even more preferably in the range of from 1 to 25 nm, further more preferably in the range of from 1 to 20 nm, even further more preferably in the range of from 1 to 15 nm, substantially more preferably in the range of from 1 to 10 nm, and most preferably in the range of from 2 to 8 nm.

The PNPs can also be post-functionalized. PNPs can be post-functionalized by varieties of techniques known in the art for post-functionalizing polymeric materials. Post-polymerization functionalization of the PNPs can be advantageous, such as for attaching dyes or chromophores for preparing colorants, for attaching to pigments for preparing dispersants and colorants, and for compatibilizing the PNPs with dispersion and ink compositions.

The PNPs are desirably discrete, unagglomerated and dispersible, miscible, or otherwise substantially compatible with/in the dispersions or inks in the fluid state or in the dried state. The compatibility of the PNPs with the balance of the ink or other composition can be determined by a comparable matching of their solubility parameters, such as the Van Krevelen parameters of delta d, delta p, delta h and delta v. See, for example, Van Krevelen et al., *Properties of Polymers. Their Estimation and Correlation with Chemical Structure*, Elsevier Scientific Publishing Co., 1976; Olabisi et al., *Polymer-Polymer Miscibility*, Academic Press, NY, 1979; Coleman et al., *Specific Interactions and the Miscibility of Polymer Blends*, Technomic, 1991; and A. F. M. Barton, *CRC Handbook of Solubility Parameters and Other Cohesion Parameters*, $2^{nd}$ Ed., CRC Press, 1991. Delta d is a measure of the dispersive interaction of the material, delta p is a measure of the polar interaction of the material, delta h is a measure of the hydrogen bonding interaction of the material, and delta v is a measure of both the dispersive and the polar interaction of the material. SI units, $J^{1/2}/cm^{3/2}$, are used herein. Such solubility parameters can either be calculated, such as by the group contribution method, or determined by measuring the cloud point of the material in a mixed solvent system consisting of a soluble solvent and an insoluble solvent. The solubility parameter at the cloud point is defined as the weighted percentage of the solvents. Typically, a number of cloud points are measured for the material and the central area defined by such cloud points is defined as the area of solubility parameters of the material.

When the solubility parameters of the PNPs and dispersion medium or ink composition medium are substantially similar, the compatibility between the PNP will be greater in/with the medium, and phase separation and/or aggregation of the PNPs is less likely to occur. It is preferred that the solubility parameters, particularly delta h and delta v, of the PNP and ink or other composition medium are substantially matched. "Substantially matched" and "substantially similar" solubility parameters are typically provided when the root-mean-square differences of the delta-d, delta-p, and delta-h solubility parameters between the PNPs and the balance of the ink or other composition medium is less than 5, preferably less than 4, and preferably less than 3 solubility units. It will be appreciated by those skilled in the art that the properties of the PNP also affect the compatibility of that PNP in the dried state.

The PNPs can be dispersed in the polymerization solvent or they can be isolated, for example, by vacuum evaporation, by precipitation into a non-solvent, and by spray drying. The isolated PNPs can be subsequently redispersed in a medium appropriate for incorporation into a dispersion or ink composition.

The colorants of this invention can be made in the presence of the PNPs or by subsequent treatment or interaction of PNPs with chromophoric moieties.

The colorants of this invention can be formed by combining solutions of chromophoric moieties, such as dyes, and PNPs. In this invention, the chromophoric moieties and the PNPs can be attached through covalent forces (e.g., to form PNP-dye macromolecules), ionic forces (e.g., to form a PNP-dye salt), dispersive forces (e.g., to form PNP-dye agglomerates), or combinations of these forces. These solutions can be either aqueous, non-aqueous, or a mixture of aqueous and non-aqueous. Accordingly, colorants can be provided by reacting, precipitating, adsorbing, agglomerating, or otherwise combining PNPs with dyes. The PNPs preferably are functionalized for covalent or ionic bonding to the chromophoric moieties. Various methods of attaching dyes to functionalized vinyl polymers are provided in U.S. Patent Application Publication US20020025994 A1.

PNP compositions suitable for the preparation of colorants, optionally with preferred post-functionalization, include, for example, DVB/VBC; DVB; DVB/S; DVB/4-vinylaniline(VAN); DVB/VBC+NH3→DVB/VBNH2; DVB+SO2Cl2→DVB/SO2Cl; DVB/VAN→DVB/N=N++ X−; and DVB/MAAh. The colorants that contain PNPs that are post-functionalized have improved dispersancy in various colorant dispersions, e.g., paints, plastics, inks and coatings.

In one embodiment of the present invention, PNPs can be used as dispersants for pigments. Pigments in an aqueous or non-aqueous medium can be dispersed or "ground" in the presence of PNPs, and optionally with other ingredients as desired. It is contemplated that heterocoagulation of the PNP onto the surface of the pigment to be stabilized can result in strong binding of the PNP to the dispersed pigment surface. The PNP dispersant can be irreversibly sorbed to the pigment surface and unaffected by the presence of water miscible organic co-solvents. The PNPs can stabilize the dispersion using both charge and steric mechanisms. Accordingly, the PNPs can be used as dispersants for both aqueous and non-aqueous pigment dispersions. The PNPs can be bonded strongly to the dispersed pigment surface by van der Wall forces, chemical bonds, or electrostatic forces, or combination of forces. In addition, the PNPs can stabilize dispersions of non-pigment particles, such as dispersions of minerals and clays. The PNPs can also be used as dispersants for polymer latices.

In several embodiments of the present invention, there are provided colorants and colorant dispersions comprising PNPs. In these embodiments, the colorants are typically pigments and the colorant dispersions are typically pigment dispersions. In these embodiments, both aqueous-based and solvent-based colorant dispersions can be prepared. In aqueous colorant dispersions, it is preferred that the PNPs contain a sufficient amount of functionality to provide a surface charge density different from zero. In non-aqueous (i.e., solvent-based) colorant dispersions, the PNPs may have a surface charge different than, or equal to, zero. In non-aqueous dispersions in general, and in non-aqueous colorant dispersions in particular, the PNPs preferably contain at least one functionality that can attach (e.g., adsorb by physical or chemical interactions) to the surface of the colorant, e.g., pigment. Examples of such functionalities include, but are not limited to, acids, aromatics, and amines. PNPs having surface charge densities different than zero can be provided by cationic and anionic polymerized units, e.g., Brønsted acids and bases, examples of which include acids, amines, and the like.

In this embodiment, the colorant dispersions will include a liquid medium, such as at least one organic solvent, water, or mixtures of an organic solvent and water. The PVC of the colorant dispersions of the present invention can be very low (e.g., 1 percent) or quite high (e.g., 99 percent). PVC values are typically up to 95 percent, more typically up to 90 percent, even more typically up to 85 percent, even further typically up to 60 percent, and most typically up to 50 percent. Preferably, the liquid medium is compatible with the PNPs.

In one embodiment of the present invention, PNPs are used as dispersants to prepare pigments and pigment dispersions for use in aqueous-based materials (e.g., coatings and inks containing aqueous latex polymer particles). In this embodiment, the amount of the PNP acid functionalities is typically at least one acid functionality per five (5) square nanometers of PNP surface area. Preferably, the amount of acid functionalities is preferably at least one (1) per one (1) square nanometer of surface area, and more preferably at least two (2) per one (1) square nanometer of surface area. The amount of acid functionalities can be determined by dividing the total number of acid functionalities in a PNP by the surface area of sphere having a diameter as that of the mean diameter of the PNP. This amount of acid functionality helps to achieve compatibility of the PNPs with aqueous latex polymer particles. This improved compatibility helps to improve the stability of the aqueous-based materials.

Providing acid functionalities can be achieved by preparing PNPs with ethylenically unsaturated acid-containing monomers. Typically, PNPs which are useful as pigment dispersants in aqueous dispersions contain units derived from 1 to 99 weight percent, preferably from 5 to 95 weight percent, more preferably from 15 to 60 weight percent, and even more preferably from 20 to 40 weight percent of an acid monomer or an acid-forming agent. Acid-forming agents typically are functional groups that can be formed into an acid by a treatment step, such as by hydrolysis. Several relationships between acid surface concentration, acid amount, and particle size for PNPs containing polymerized units of AA (acid functionality is COOH) are provide in the following table:

| Table of acid surface concentration versus particle size and acid content | | | | |
|---|---|---|---|---|
| PNP mean diameter, nm | Polymer surface area (a) | Percent AA w/w on total monomer composition | Area per COOH (square Ångstroms) | COOH per 1 nm$^2$ |
| 50 | $3.6 \times 10^4$ | 2.0 | 72 | 1.4 |
| 20 | $9.0 \times 10^4$ | 5.0 | 72 | 1.4 |
| 10 | $1.8 \times 10^5$ | 10.0 | 72 | 1.4 |
| 5 | $3.6 \times 10^5$ | 20.0 | 72 | 1.4 |
| 2 | $9.0 \times 10^5$ | 50 | 72 | 1.4 |

(a) Based on 1 L aqueous PNP dispersion, 30% solids

While any acid-containing monomer can be used in these embodiments, it is typical that the acid-containing monomer is copolymerizable by free radical polymerization. Among typical acid-containing monomers are the ethylenically unsaturated carboxylic acids, of which acrylic acid and methacrylic acid are used preferably, and macromonomeric acids. Typically, the PNPs which are useful as pigment dispersants contain units derived from 1 to 50 weight percent, preferably from 2 to 40 weight percent, more preferably from 3 to 20 weight percent, and even more preferably from 5 to 15 weight percent of at least one multi-ethylenically-unsaturated monomer. Preferably, the acid functionalities of the PNPs are neutralized with a suitable neutralizing base, such as hydroxides (e.g., sodium hydroxide, potassium hydroxide), amines, and preferably ammonia. For use in aqueous-based applications, the PNPs are preferably prepared in an aqueous-compatible solvent (e.g., an alcohol such as IPA), neutralized with a base, and diluted in water prior to carrying out the pigment dispersion. Preferably, the aqueous-compatible solvent is at least partially removed, more preferably a majority of the aqueous-compatible solvent is removed, and most preferably the aqueous-compatible solvent substantially completely removed, from the PNPs.

PNP dispersants that contain acid monomers and multi-ethylenically-unsaturated monomers, can optionally contain up to 98 weight percent of units derived from other ethylenically unsaturated monomers which are neither acid-containing nor multi-ethylenically-unsaturated monomers. Similarly, the PNPs useful as dispersants may also contain optional functional monomers including, but not limited to, such functionalities as hydroxyl, acetoacetate, acrylamides, acrylamide/formaldehyde adducts, ureido, amine, siloxane, silane, and the like.

Aqueous-based pigment dispersions are useful in coating and ink formulations containing aqueous polymer latex binders. Preferably, the aqueous dispersions containing acid-containing PNPs are prepared having a pH of at least 6. Aqueous pigment dispersions prepared using PNPs containing acid monomers, such as MAA or AA, typically have a pH of at least 8, preferably at least 8.5, and most preferably in the range of from 8.5 to 9.5. While any base may be used for increasing pH, such as an alkali hydroxide, e.g., NaOH, ammonia is preferred. If the pH is too high, then an excess of the base can be deleterious to the pigment dispersion. Aqueous pigment dispersions containing PNPs prepared using stronger acid monomers, e.g., PEM, can be prepared at pH values lower than 9.5, preferably lower than 7, which allows for lower amounts of base being needed (e.g., lower amounts of ammonia help reduce odor).

Typically, the amount of PNP dispersant required to sufficiently disperse pigments is determined by ensuring that the ratio of the PNP "gyre" surface area to the pigment surface area is greater than 0.7:1, typically at least 1:1, more typically at least 1.5:1, and even more typically at least 2:1. The PNP "gyre" surface area is akin to the projected surface area of the three-dimensional PNP particle onto a two-dimensional surface. PNP "gyre" and pigment surface areas are calculated by the following equations:

$$PNP \text{ Gyre Surface Area}=\pi(PNP \text{ mean diameter}/2)^2$$

$$\text{Pigment Surface Area}=4\pi(\text{pigment mean diameter}/2)^2$$

The pigment mean diameter is determined by measuring the surface area of the pigment using BET nitrogen absorption and assuming a spherical pigment particle shape.

In one embodiment of the present invention, pigments can be prepared by removing at least a portion of the liquid medium from the pigment dispersions of the present invention, for example by filtration, drying, and evaporation.

In one embodiment of the present invention, there are provided pigments and pigment dispersions comprising PNPs, the PNPs having as polymerized units at least one multi-ethylenically-unsaturated monomer, and at least one block- or graft copolymer having at least one hydrophobic polymer block and at least one hydrophilic polymer block. Preferred hydrophobic blocks have a delta h solubility parameter less than 0.5, preferably less than 0.2, and more preferably less than 0.1. Preferred hydrophobic blocks contain polymerized units of alkyl (meth)acrylate monomers, more preferably BA and MMA monomers. The hydrophilic blocks will be different from the hydrophobic blocks. Preferred hydrophilic blocks have a delta h solubility parameter greater than zero (0), preferably greater than 0.1, and more preferably greater than 0.2. Preferred hydrophilic blocks contain polymerized units of alkyl (meth)acrylic acid monomers, more preferably AA and MAA monomers. The block- or graft-copolymer can be blended with the PNPs in a number of ways, including solvent blending, melt blending, and synthesis of either one of the block-copolymer, graft-copolymer, or the PNP, in the presence of the other. The resulting pigment dispersion made with PNP/block copolymer dispersant have improved compatibility with, and provide improved stability to, alkyd paints.

In one embodiment, PNPs are used as dispersants in polymer particle dispersions, e.g., dispersions such as polymer latices prepared by emulsion polymerization processes. In these embodiments, the PNPs generally contain acid. Preferably, the PNPs are prepared using an acid-containing monomer. It is also preferred that the acid content is sufficiently high to provide an electrostatic charge layer around the PNPs. Suitable acid contents of PNPs useful as dispersants can be estimated by the acid contents of typical "high acid" polymers which are known to act as stabilizers for emulsion polymerizations. The PNPs of the present invention can be used as dispersants in emulsion polymerizations according to the methods known for using "high acid" polymeric stabilizers, as described in U.S. Pat. No. 4,845,149 and U.S. Pat. No. 6,020,061.

Typically, PNPs which are useful as dispersants for aqueous polymeric particle dispersions contain units derived from 1 to 99 weight percent, preferably from 5 to 95 weight percent, more preferably from 15 to 60 weight percent, and even more preferably from 20 to 40 weight percent of an acid monomer or an acid-forming agent. While any acid-containing monomer can be used, it is typical that the acid-containing monomer is copolymerizable by free radical polymerization. Among typical acid-containing monomers are the ethylenically unsaturated carboxylic acids, of which acrylic acid and methacrylic acid are preferably used. Typically, the PNPs which are useful as dispersants contain units derived from 1 to 50 weight percent, preferably from 2 to 40 weight percent, more preferably from 3 to 20 weight percent, and even more preferably from 5 to 15 weight percent of at least one multi-ethylenically-unsaturated monomer. Preferably, the acid functionalities of the PNPs are neutralized with a suitable neutralizing base, such as hydroxides (e.g., sodium hydroxide, potassium hydroxide), amines, and preferably ammonia. More preferably, such PNPs are prepared in an aqueous-compatible solvent, neutralized with a base, and diluted in water prior to carrying out the emulsion polymerization. Even more preferably, the aqueous-compatible solvent is at least partially removed, and most preferably substantially completely removed, from the PNP dispersion prior to carrying out the emulsion polymerization.

While such PNP dispersants contain acid monomers and multi-ethylenically-unsaturated monomers, the PNPs can optionally contain up to 98 weight percent, preferably up to 90 weight percent, and more preferably up to 80 weight percent of units derived from other ethylenically unsaturated monomers which are not acid-containing and not multi-ethylenically-unsaturated monomers. Similarly, the PNPs useful as dispersants may also contain optional functional monomers including, but not limited to, such functionalities as hydroxyl, acetoacetate, acrylamides, acrylamide/formaldehyde adducts, ureido, amine, and the like.

Ranges for use of PNPs as dispersants in emulsion polymerization are as follows: 5 to 80, preferably 10 to 60, and more preferably 15 to 40 weight percent PNPs based on total weight of the PNPs and the emulsion polymer media.

Among suitable emulsion polymer compositions, any emulsion polymer, copolymer, multi-stage copolymer, interpolymer, core-shell polymer, and the like can incorporate the PNP dispersants of the present invention. While any ethylenically unsaturated monomer may be used, it is preferred that the emulsion polymers which incorporate the PNP dispersants are prepared from at least one of (meth)acrylic, vinyl acetate, and vinylaromatic monomers.

In one embodiment of the present invention is provided a dispersion that includes particles and PNPs dispersed in a liquid medium. While the PNPs are useful for preparing any type of particle dispersions in this embodiment, the particles are typically colorants. As described hereinbefore, colorants are substances that include a chromophore, such as pigments and dyes. In this embodiment, the colorants that are used to make colorant dispersions are typically attached to PNPs. Examples of colorants attached to PNPs include, but are not limited to PNPs having attached chromophores, such as pigments having adsorbed PNPs as described hereinabove, PNPs having attached dyes, and PNPs having attached chromophore chemical units which are neither pigments nor dyes. Chromophores can be attached to PNPs through covalent, ionic, and dispersive interactions.

In the present invention, the chromophores can be attached to at least a portion of the PNPs. When the chromophores are pigments, the required ratios of PNP to pigment are provided according to the PNP gyre surface area relationship as described hereinabove. When the chromophores are dyes or other attached chromophore chemical units on the PNPs, it is typical that at least 10%, preferably at least 25%, more preferably at least 50%, even more preferably at least 75% and even more preferably at least 95% of the PNPs have at least one attached chromophore to the PNPs. Higher chromophore-content PNPs are also envisioned whereby the PNPs each contain, on average, more than one attached chromophore. Examples of dyes or other chromophore chemical units that can be attached to polymers, which can also be attached to PNPs, are provided in U.S. Patent Application Publication US20020025994 A1.

In one embodiment of the present invention, an ink is prepared from the colorant dispersion described hereinabove.

In one embodiment of the present invention, the PNPs can be incorporated into an ink composition by admixing the PNPs or a dispersion of the PNPs with other dissolved or dispersed polymers and/or other ink adjuvants as are well known to those skilled in the art of ink formulation. The ink compositions can also contain colorants of the present invention. The ink can include an aqueous or non-aqueous medium. The ink composition can contain conventional ink adjuvants such as, for example, pigments, emulsifiers, monomers, oligomers, polymers, solvents, coalescing agents, buffers, neutralizers, thickeners or rheology modifiers, humectants, wetting agents, biocides, plasticizers, antifoaming agents, colorants, waxes, and anti-oxidants.

It is contemplated that the incorporation of PNPs as binders in inkjet inks can minimize the degradation of printhead performance. High glass transition temperature ("Tg") latex binders are typically more robust than low Tg latex binders when used in inkjet ink formulations in an ink jet printer. However, with high Tg binders, a fuser is typically required on the product print. In one embodiment of this invention a small amount of a high Tg PNP in an ink formulation containing a low Tg latex binder can result in significant performance increase of these inks in ink jet printheads. It is contemplated that the high Tg PNPs, preferably having 5 to 40 nm diameter, will protect the low Tg binder from fouling the resistive heater element and from heterocoagulating with the dispersed pigment particles or with the interior surface of the printhead.

The ink can be applied to a substrate such as, for example, plastic including sheets and films, wood, metal, leather, woven or nonwoven fabric, paper, with or without a prior substrate treatment such as an electrostatic treatment or a primer.

The following examples are presented to illustrate further various aspects of the present invention.

EXAMPLE 1

Preparation of PNPs

A 500 mL reactor was fitted with a thermocouple, a temperature controller, a purge gas inlet, a water-cooled reflux condenser with purge gas outlet, a stirrer, and an addition funnel. To the addition funnel was charged 201.60 g of a monomer mixture consisting of 18.00 g methyl methacrylate (100% purity), 2.00 g diethyleneglycol dimethacrylate (100% purity), 1.60 g of a 75% solution of t-amyl peroxypivalate in mineral spirits (Luperox 554-M-75), and 180.00 g diisobutyl ketone ("DIBK"). The reactor, containing 180.00 g DIBK was then flushed with nitrogen for 30 minutes before applying heat to bring the contents of the reactor to 75° C. When the contents of the reactor reached 75° C., the monomer mixture in the addition funnel was uniformly charged to the reactor over 90 minutes. Thirty minutes after the end of the monomer mixture addition, the first of two chaser aliquots, spaced thirty minutes apart and consisting of 0.06 g of a 75% solution of t-amyl peroxypivalate in mineral spirits (Luperox 554-M-75) and 2.00 g DIBK, was added. At the end of the second chaser aliquot, the contents of the reactor were held 2½ hours at 80° C. to complete the reaction. The resulting polymer was isolated by precipitation with heptane, collected by filtration and dried under vacuum to yield a white powder. This material was redissolved in propyleneglycol monomethylether acetate. The PNPs thus formed had a particle size distribution of from 0.8 to 5.0 nm with mean of 1.4 nm as determined by dynamic laser light scattering and a molecular weight of about 22,642 g/mol with a number average molecular weight of about 14,601 g/mol and Mw/Mn distribution of 1.6 as measured by GPC.

EXAMPLE 2

Preparation of PNP—AAEM/ALMA Copolymer by a Semi-batch Emulsion Polymerization Process A monomer emulsion was made from a mixture of 17 g deionized water, 8.85 g of 28% w/w solids ammonium lauryl sulfate ("ALS"), 12.4 g acetoacetoxyethyl methacrylate ("AAEM"), and 1.78 g allyl methacrylate ("ALMA"). A reaction kettle was then prepared with 600 g deionized water, 15.0 g of 28% w/w solids ALS, and 0.15 g ammonium persulfate ("APS") in 1 mL deionized water. The reaction kettle was heated to 90° C. while being purged with nitrogen. One half of the monomer emulsion was added to the reaction kettle with stirring at 200 rpm. After 20 minutes, the remaining monomer emulsion was added. The kettle temperature was kept at 90° C. for 30 minutes, cooled to 55° C., and then a solution of 0.02 g t-butyl hydroperoxide ("t-BHP") in 1 mL of deionized water and a solution of 0.010 g sodium sulfoxylate formaldehyde ("SSF") in 1 mL of deionized water were added respectively. The reaction was then cooled to ambient temperature and the emulsion was filtered through 400 and 100 mesh sieves respectively.

The sample was isolated from water by freeze-drying to produce a white friable, free flowing powder. The resulting white powder was washed with copious amounts of doubly distilled and deionized water to remove most of the surfactant.

EXAMPLE 3

Preparation of PNPs—AAEM/ALMA Copolymer Prepared by a Batch Emulsion Polymerization Process A monomer emulsion was made from a mixture of 17 g deionized water, 8.85 g of 28% w/w solids ALS, 12.4 g AAEM, and 1.78 g ALMA in a bottle. A reaction kettle was then prepared with 600 g deionized water, 15.0 g of 28% w/w solids ALS, and 0.15 g APS in 1 mL deionized water. The reaction kettle was heated to 90° C. while being purged with nitrogen. The monomer emulsion was added all at once to the reaction kettle with stirring at 200 rpm. After 30 minutes, the temperature of the reaction flask was cooled to 75° C., and then a solution of 0.02 g t-BHP in 1 mL of deionized water was added. The reaction was cooled further to 55° C., and a solution of 0.010 g SSF in 2 mL of deionized water was added. The reaction was cooled to ambient temperature and the emulsion was filtered through 400 and 100 mesh sieves respectively.

EXAMPLE 4

Preparation of PNPs Prepared by a Gradual-add Polymerization Process

A monomer emulsion was made from a mixture of 100 g water, 1.60 g of 28% w/w solids ALS, 68 g ethyl acrylate ("EA"), 17 g methyl methacrylate ("MMA"), 12.5 g divinyl benzene ("DVB"), and 5 g methacrylic acid ("MAA"). A reaction kettle containing 445 g water, 22.2 g of 28% w/w solids ALS and 0.37 g APS was heated to 85° C. under a nitrogen atmosphere. The monomer emulsion was fed to the kettle over 90 minutes. The reaction was held at 85° C. for 30 minutes after the end of the feed, and then cooled to 65° C. After cooling, 1.33 g of 10% iron sulfate ($FeSO_4$) was added. After 1 minute, 0.2 g of 70% t-BHP was added and after 2 minutes 0.10 g of 100% isoascorbic acid ("IAA") and the reaction held for 15 minutes. A second chaser system was added in the same sequence and over the same time. The reaction was then cooled to ambient temperature and filtered through a 400 mesh sieve.

EXAMPLE 5

Preparation of Various PNPs

PNP compositions are reported in Table 5.1. These polymers were prepared according to the general procedures of Examples 1–4. The abbreviation "Mw" refers to the weight average molecular weight and the term "Mn" refers to the number average molecular weight. The term "Dist" refers to the ratio of Mw/Mn. The molecular weights were measured using a standard GPC method with tetrahydrofuran as the solvent.

TABLE 5.1

PNP compositions

| Sample 5- | Composition | Ratio | Mw | Mn | Dist |
|---|---|---|---|---|---|
| 1 | HEMA/DEGDMA | 90/10 | | | |
| 2 | MMA/DEGDMA | 90/10 | | | |
| 3 | MMA/DEGDMA | 90/10 | 19073 | 11183 | 1.7 |
| 4 | MMA/DEGDMA | 90/10 | 644 | 221 | 2.9 |
| 5 | MMA/DEGDMA | 90/10 | 7710 | 3989 | 1.9 |
| 6 | MMA/MAPS/DEGDMA | 70/20/10 | 10640 | 4254 | 2.5 |
| 7 | MMA/MAPS/DEGDMA | 80/10/10 | 12819 | 8091 | 1.6 |
| 8 | MMA/MAPS/DEGDMA | 60/30/10 | | | |
| 9 | MMA/MAPS/DEGDMA | 40/50/10 | 43667 | 9047 | 4.8 |
| 10 | MMA/MAPS/DEGDMA | 20/70/10 | 166432 | 7404 | 22.5 |
| 11 | MAPS/DEGDMA | 90/10 | 11683 | 3484 | 3.4 |
| 12 | MMA/MAPS | 88.9/11.1 | 15965 | 7424 | 2.2 |
| 13 | BA/DEGDMA | 90/10 | 51007 | 29065 | 1.8 |
| 14 | MMA/MAPS/PETTA | 80/10/10 | | | |
| 15 | MMA/MAPS/PPG4000DMA | 80/10/10 | | | |
| 16 | MMA/MAPS/DPEPA | 80/10/10 | | | |
| 17 | MMA/MAPS/TMPTMA | 80/10/10 | | | |
| 18 | MMA/MAPS/DEGDMA | 75/10/15 | | | |
| 19 | MMA/MAPS/DEGDMA | 85/10/5 | | | |
| 20 | MMA/MAPS/DVB | 10/60/30 | 95613 | 12003 | 8.0 |
| 21 | MMA/MAPS/DVB | 20/60/20 | 110422 | 19814 | 5.6 |
| 22 | MMA/MAPS/DVB | 25/60/15 | | | |
| 23 | MMA/MAPS/DVB | 30/60/10 | | | |
| 24 | MMA/MAPS/DEGDMA | 20/70/10 | 35249 | 7438 | 4.7 |
| 25 | MMA/MAPS/DEGDMA | 30/60/10 | 35105 | 7003 | 5.3 |
| 26 | MMA/MAPS/DVB | 10/80/10 | 331732 | 29918 | 11.1 |
| 27 | STY/MAPS/DVB | 30/60/10 | 38455 | 12320 | 3.1 |
| 28 | BA/MAPS/DVB | 30/60/10 | 499094 | 36317 | 13.7 |
| 29 | BA/MAPS/DVB | 10/80/10 | 312848 | 16102 | 19.4 |
| 30 | BA/TMSMA/DVB | 10/80/10 | 674730 | 30989 | 21.8 |
| 31 | BA/MOPTSOMS/DVB | 10/80/10 | 97530 | 12154 | 8.0 |
| 32 | BA/MOPMDMOS/DVB | 10/80/10 | 363561 | 37553 | 9.7 |
| 33 | BA/MAPS/TAT | 10/80/10 | 12201 | 5182 | 2.4 |
| 34 | ALMA/BA/DVB | 10/80/10 | | | |
| 35 | IBOMA/MAPS/DVB | 10/80/10 | | | |
| 36 | BA/DVB | 90/10 | 223436 | 29309 | 7.6 |
| 37 | BA/PGDMA | 90/10 | 26797 | 8242 | 3.3 |
| 38 | BA/ALMA | 90/10 | 104529 | 15967 | 6.5 |
| 39 | BA/TMPTMA | 90/10 | 39638 | 16306 | 2.4 |
| 40 | BA/DPEPA | 90/10 | 103945 | 18702 | 5.6 |
| 41 | EHA/DVB | 90/10 | | | |
| 42 | EHA/ALMA | 90/10 | | | |
| 43 | EHA/TMPTMA | 90/10 | | | |
| 44 | EHA/DPEPA | 90/10 | | | |
| 45 | STY/DVB | 90/10 | | | |
| 46 | STY/ALMA | 90/10 | | | |
| 47 | EHA/STY/ALMA | 20/70/10 | | | |
| 48 | EHA/STY/ALMA | 45/45/10 | | | |
| 49 | MMA/DEGDMA | 90/10 | 22642 | 14601 | 1.6 |

EXAMPLE 6

Preparation of 50/50=DVB/VBC PNPs

A mixture of DVB (0.5M), VBC (0.5M) in isooctane (1 l.) is heated and stirred under reflux and t-butyl peroctoate (0.02M) is added gradually over a 1 hour period with vigorous agitation. When the polymerization is complete (2–4 hours), reserve for subsequent reactions.

EXAMPLE 7

50:50=DVB/Vinylbenzylamine(VBA) PNPs; Ammonolysis of the 50/50=DVB/VBC Copolymer Treat the reaction mixture of Example 6 with an excess of ammonia (2 M) in methanol (200 ml) in a 200psig-rated autoclave. Heat and stir for 1 hr.; then cool. Check an aliquot to insure that all the organic chloride present has been converted to inorganic chloride. Add water (1 l.) to water-wash, separate the organic phase, rewash with water then azeotrope the organic phase to dry it. Titrate an aliquot of the dispersion with standard acid to determine its amine content.

EXAMPLE 8

Aminoalkylated Anthraquinone Red 177 Analog PNPs

Mix Anthroquinone Red 177 (0.05M) pigment with a 0.1M aliquot of the PNP dispersion of Example 6, potassium carbonate ((0.1M) and DMSO (200 ml). Heat and stir while removing isooctane overhead until a pot temperature of 175° C. is reached and hold at 175° C. for 3 hours. Strip off the DMSO under vacuum using a Rotary evaporator. Add water and wash the contents into centrifuge bottles. Decant the aqueous phase, rewash the residue with hot water, again centrifuge, and remove the supernatant. Dry the residue under vacuum to isolate the product. The pigment product of this example is useful for the preparation of inkjet inks and for use for other printing and decorating purposes.

EXAMPLE 9

Aminoalkylated Anthraquinone PNP Analogs from Disperse Red 60 and from Solvent Red 172

In a manner anlogous to Example 8, convert the dyes named above to their aminoalkylated PNP analogs. Other high-boiling media can be employed including N-methylpyrrolidinone(NMP), HMPA, and N,N'-dimethylethyleneurea (DMEU), instead of DMSO. In a similar manner, PNP alkylated quinacridones, pyranthrones,and perylenes are prepared. The colorant product of this example is useful for the preparation of inkjet inks and for use for other printing and decorating purposes.

EXAMPLE 10

Aminoalkylated Disperse Yellow 54 PNP Analog

In a manner analogous to Examples 8 and 9 convert Disperse Yellow 54 to its aminoalkylated PNP analog. The pigment product of this invention is useful for the preparation of inkjet inks and for use for other printing and decorating purposes.

EXAMPLE 11

Sulfonylated Anthraquinone Dye PNP Analogs

Following the procedure of Example 6 but substituting STY for VBC, prepare a dispersion of 50/50=DVB/S PNPs in isooctane. Treat that dispersion with a 30% molar excess of SO2Cl2 under reflux conditions, venting the HCl gas (and some SO2) into a scrubber in the course of the reaction. When gas evolution has ceased, remove the isooctane and excess SO2Cl2 under vacuum, and redisperse the sulfonylated PNPs in fresh isooctane for subsequent use. Use aliquots of this dispersion/"solution" for the preparation of sulfonylamido PNP analogs of Anthraquinone Red 177, Disperse Red 60, Solvent Red 172 and Disperse Yellow 54 using the process of Example 8. The pigment product of this example is useful for the preparation of inkjet inks and for use for other printing and decorating purposes.

EXAMPLE 12

Triaminotriazine PNP Analogs of Reactive Blue 2 and Reactive Blue 5

Treat each of the monochlorodiaminotriazine precursors of Reactive Blue 2 and of Reactive Blue 5 with a 20M % excess of the product of Example 7 using one of the preferred media shown in Example 9 and the methodology of Example 8. Following the water washes, wash the solids with aqueous acetic acid to remove unconverted DVB/VBA PNPs, dry under vacuum to give the desired triaminotriazine Reactive Blue PNP analogs. The pigment product of this invention is useful for the preparation of inkjet inks and for use for other printing and decorating purposes.

EXAMPLE 13

PNP Phthalocyanine Pigment Analogs

Chlorosulfonated phthalocyanine pigments are commercially available. These are dispersed in HPMA, a molar excess of the DVB/VBA product of Example 7 and excess potassium carbonate are added and the reactions are carried out as in the process of Example 8. After the water washing to remove the inorganic chloride and excess base, the residue is treated with aqueous acetic acid to remove excess DVB/DVA PNPs, then is dried under vacuum to give the desired sulfonamidophthalocyanine PNPs. The pigment products of this example are useful for the preparation of inkjet inks and for use for other printing and decorating purposes.

EXAMPLE 14-A

Preparation of Dispersion and Ink 100 grams of carbon black is added to 500 grams of an aqueous solution of 10 nm PNPs (5% solids, BA/AA/TMPTA, pH adjusted to 7 to 9 with potassium hydroxide). The mix is dispersed using a high speed disc disperser so that the carbon black is wetted. This premix is fed in a 50 ml Eiger horizontal media mill charged with 0.5 mm polystyrene/DVB grinding media. The mix is milled in recirculation mode until the particle size of the dispersed carbon black is between 90 and 120 nm. The fine dispersion of this invention of carbon black is found to be stable to the presence of organic co-solvents, to freeze-thaw cycling and to thermal aging. The fine dispersion of carbon black is used as a colorant in an inkjet ink formulation consisting of 6.5 g N-methyl -2-pyrrolidone, 4.0 g polyethylene glycol—600, 10.2 g 1,3 propanediol, 20 g PNP-dispersed carbon black, and 59.3 g of deionized water. The ink of this invention is well mixed, filtered through a 1 micron glass microfiber filter, and injected into an HP51629A inkjet cartridge. The cartridge is used to jet high quality print images.

EXAMPLE 14-B

Preparation of Dispersion and Improved Ink 100 grams of carbon black is added to 500 grams of an aqueous solution containing Tamol 731 dispersant (2% by weight on carbon black, pH adjusted to between 8 and 11). The mix is dispersed using a high speed disc disperser so that the carbon black is wetted. This premix is fed in a 50 ml Eiger horizontal media mill charged with 0.5 mm polystyrene/DVB grinding media. The mix is milled in recirculation mode until the particle size of the dispersed carbon black is between 90 and 120 nm. To the dispersion in the mill is added 10 nm nanoparticles (5% solids, BA/AA/TMPTA, pH adjusted to 7 to 9 with potassium hydroxide) and milling is continued for at least 30 minutes. The fine dispersion of this invention of carbon black is found to be stable to the presence of organic co-solvents, to freeze-thaw cycling and to thermal aging. The fine dispersion of carbon black is used as a colorant in an inkjet ink formulation consisting of 6.5 g N-methyl-2-pyrrolidone, 4.0 g polyethylene glycol—600, 10.2 g 1,3 propanediol, 20 g nanoparticle-dispersed carbon black, and 59.3 g of deionized water. The ink of this invention is well mixed, filtered through a 1 micron glass microfiber filter, and injected into an HP51629A inkjet cartridge. The cartridge is used to jet high quality print images.

EXAMPLE 15

Preparation of Ink

To an ink jet ink formulation containing 6.5 g N-methyl-2-pyrrolidone, 4.0 g polyethylene glycol—600, 10.2 g 1,3 propanediol, 20 g Acryjet™ Black 357 (20% solids), 8 g of latex binder (50% solids, −20° C. Tg) and 59.3 g of deionized water is added 6.7 g of a 15% solids solution of PNP (10 nm diameter PNP, BA/AA/TMPTA 30/60/10) in water. The ink is well mixed, then used to fill an HP51629A inkjet cartridge. The cartridge is printed to dryness with no evidence of nozzle clogging, misdirection, or nozzle crusting and gives high quality printed product having excellent wet rub, highlight, and dry rub resistance.

EXAMPLE 16

Preparation if Ink

To an ink jet ink formulation containing 4.8 g N-methyl 2-pyrrolidone, 4.0 g Liponic EG-7 (Lipo Chemicals), 7.6 g methyl carbitol, 20 g Acryjet™ Yellow 747 (Rohm and Haas Company) (20% solids), 8 g of latex binder (50% solids, −20° C. Tg) and 59.3 g of deionized water is added 6.7 g of a 15% solids solution of PNP (10 nm diameter PNP, BA/AA/TMPTA 30/60/10) in water. The ink is well mixed, then used to fill an HP51629A inkjet cartridge (Hewlett Packard). The cartridge is printed to dryness with no evidence of nozzle clogging, misdirection, or nozzle crusting and gave high quality printed product having excellent wet rub, highlight, and dry rub resistance.

EXAMPLES 17-1 to 17-8

PNPs Used as Pigment Dispersants

Pigment dispersions were prepared using aqueous PNPs as pigment dispersants as indicated below. The PNPs used in these examples were originally prepared in IPA, neutralized with ammonia, diluted with water. The IPA was removed prior to preparing the pigment dispersions. "% w/w solids" refers to PNP solids weight percent based on total weight PNP and water. Test results are also indicated.

EXAMPLE 17-1

| Component | Parts, wt. |
| --- | --- |
| PNP Dispersant: 10 nm 11.5% w/w solids 70MMA/20MAA/10TMPTA dispersion | 12.0 |
| Propylene glycol | 2.0 |
| Red Iron Oxide Copperas ™ R-1299 (Elementis Pigments) | 30.0 |

Polymer gyre:pigment surface area was 2:1, pigment:binder 4.8:1, PVC 83%, weight solids 71% w/w, volume solids 39% v/v, density 2.192 kg/L. Added 5.0 g to 25 g of acrylic trade sales semigloss waterbased paint and found good compatibility and stability, and less than 5% color development upon high shear.

EXAMPLE 17-2

| Component | Parts, wt. |
| --- | --- |
| PNP Dispersant: 4 nm 27.8% w/w solids 70MMA/20AA/10TMPTA dispersion | 8.0 |
| Tap water | 4.9 |
| TiO2 TiPure ™ R-706 (DuPont) | 25 |

Polymer gyre surface area:pigment surface area was 4:1, pigment:binder 3:1, PVC 75%, weight solids 72% w/w, volume solids 45% v/v, density 2.042 kg/L. A good pigment dispersion was formed.

EXAMPLE 17-3

| Component | Parts, wt. |
| --- | --- |
| PNP Dispersant: 4 nm 27.0% w/w solids 70MMA/20MAA/10TMPTA dispersion | 30.0 |
| Propylene glycol | 1.0 |
| Quinacridone Quindo ™ Red R-6700 (Mobay Chem.) | 10.0 |

Polymer gyre area:pigment area was 5:1, pigment:binder 0.8:1, PVC 43%, weight solids 44% w/w, volume solids 38% v/v, density 1.192 kg/L, good color acceptance into trade flat white above CPVC test paint.

EXAMPLE 17-4

| Component | Parts, wt. |
| --- | --- |
| PNP Dispersant: 10 nm 11.5% w/w solids 70MMA/20MAA/10TMPTA dispersion | 35 |
| Quinacridone Quindo ™ Violet RV-6926 (Mobay Chem.) | 10 |

Polymer gyre area:pigment area was 0.7:1, pigment:binder 1.9:1, PVC 65%, weight solids 31% w/w, volume solids 27% v/v, density 1.145 kg/L, poor color acceptance into trade flat white above CPVC test paint (insufficient polymer surface area to disperse and stabilize pigment). This example shows that the pigment gyre area:pigment area is typically greater than 0.7:1.

EXAMPLE 17-5

| Component | Parts, wt. |
| --- | --- |
| PNP Dispersant: 10 nm 11.5% w/w solids 70MMA/20MAA/10TMPTA dispersion | 25 |
| Phthalocyanine Blue Heliogen ™ L6875F (BASF) | 15 |

Polymer gyre area:pigment area was 0.4:1, pigment:binder 3.4:1, PVC 77%, weight solids 45% w/w, volume solids 36% v/v, density 1.241 kg/L, poor dispersion (insufficient polymer surface area to disperse and stabilize pigment). This example shows that the pigment gyre area:pigment area is typically greater than 0.4:1.

EXAMPLE 17-6

| Component | Parts, wt. |
| --- | --- |
| PNP Dispersant: 4 nm 27.8% w/w solids 70MMA/20MAA/10TMPTA dispersion | 22.1 |
| Tap water | 6 |
| Ammonia solution 28% | 0.4 |
| Phthalocyanine Blue Heliogen ™ L6875F (BASF) | 12 |

Polymer gyre area:pigment area 2.4:1, pigment:binder 1.3:1, PVC 56%, weight solids 45% w/w, volume solids 38% v/v, density 1.143 kg/L. Good dispersion resulted.

EXAMPLE 17-7

A Lamp Black pigment dispersion was made from the following formulation:

| Component | Parts by Weight |
| --- | --- |
| PNPs: 4 nm 27% aqueous latex solids, prepared by neutralizing IPA-based with ammonia MMA/MAA/TMPTP 70/20/10 | 25 |
| water | 8 |
| Ammonia 28% | 0.18 |
| Black Pigment - RAVEN 14 ™ (Columbian Chemicals Co.) | 12 |

The above formulation was milled for 5 minutes at 2500 rpm with 46 parts 1 mm glass beads using a laboratory mill to provide a black pigment dispersion. pH was in the range of 7–9.

A grey paint formulation was prepared with this black pigment dispersion as follows: 0.83 parts of the pigment dispersion was mixed using low shear with 10.1 parts of a low TiO2 semigloss acrylic latex paint. Tint Acceptance (Rub Up test) gave a Delta E of 0.3.

Pigment Dispersion Characteristics: Density 1.138, Weight Solids 43.7%, Volume Solids 37.2%, pigment content 27.6%, polymer cross section ("gyre") to pigment surface area 2:1. The pigment loading is high for this pigment (normally 15 to 20 pigment content percent based on total weight of the dispersion). By way of comparison, UCD Q-Line has 17.5% Raven 14 pigment. The dispersion time was shorter than expected (less than 5 minutes versus 10–20 minutes was expected). There was little change in viscosity of the tinted paint. The Tint Acceptance (Delta E of 0.3 was hardly perceptible) is much better than a pigment dispersion prepared with a comparable uncrosslinked copolymer dispersant used under similar conditions.

EXAMPLE 17-8

In this example, the black pigment dispersion of Example 17-7 is repeated with the exception that the PNP contains a block copolymer. The block copolymer contains hydrophobic blocks containing polymerized units of BA and MMA, and a hydrophilic second block containing polymerized units of MAA. The block copolymer is solvent-blended with the IPA-based PNP solution used in Example 17-7 (block copolymer solids: PNP solids is 1:2). The resulting pigment dispersion made with the PNP/block copolymer dispersant has improved compatibility and stability with alkyd paints.

EXAMPLE 18

A metal primer coating composition containing a latex-based polymer particle dispersion stabilized with a PNP dispersant was prepared using a standard paint formulation methodology. The metal primer coating composition is provided in the following table:

| Component | Parts, wt. |
| --- | --- |
| PNP Dispersant: 4 nm 27.8% w/w solids 70MMA/20AA/10TMPTA dispersion | 11.0 |
| Tap water | 6.0 |
| Dowanol ™ DPM (Dow Chemical) | 2.0 |
| Ammonia solution 28% | 0.1 |
| Ti-Pure ™ R-706 (DuPont) | 21.5 |
| Mistron ™ 353 Talc (Luznac America) | 14.5 |
| Omyacarb ™ UF Calcium Carbonate (Omya Corp. S.A.) | 7.26 |
| Maincote ™ HG-86 (Rohm and Haas) | 39.2 |
| Tap water | 11.6 |
| Triton ™ CF-10 | 0.2 |
| Texanol ™ (Eastman Chemical) | 2.58 |
| Sodium Nitrite 10% | 0.87 |
| Ammonia solution 28% | 0.48 |
| Acrysol ™ RM-8W (Rohm and Haas) | 0.29 |

The resulting coating was effectively stabilized using the PNP dispersant of this example.

EXAMPLES 19 to 31

PNPs Used as Dispersants for Polymer Latices

EXAMPLE 19

PNPs of methyl methacrylate/methacrylic acid/trimethylol propane triacrylate (70/20/10 wt. %) were prepared via solution polymerization as follows: A 5 liter reactor was fitted with a thermocouple, a temperature controller, a purge gas inlet, a water-cooled reflux condenser with purge gas outlet, a stirrer, and a monomer feed line. To a separate vessel was charged 450.00 grams of a monomer mixture (A) consisting of 315.00 gm. methyl methacrylate (MMA), 90.00 gm methacrylic acid (MAA), and 45.00 gm trimethylol propane triacrylate (TMPTA). To an additional vessel was charged an initiator mix (B) consisting of 18.00 gm. of a 75% solution of t-amyl peroxypivalate in mineral spirits (Triganox 125–C75), and 112.50 gm. isopropyl alcohol. A charge of 2325.00 gm isopropyl alcohol was added to the reactor. After sweeping the reactor with nitrogen for approximately 30 minutes, heat was applied to bring the reactor charge to 79° C. When the contents of the reactor reached 79° C., a dual feed of both the monomer mixture (A) and the initiator mix (B) to the reactor. The two mixtures were fed uniformly using feed pumps over 120 minutes. At the end of the monomer and initiator feeds, the batch was held at 79° C. for 30 minutes before adding the first of three initiator chasers consisting of 9.00 grams of a 75% solution of t-amyl peroxypivalate in mineral spirits (Triganox 125-C75), and 22.50 gm. Isopropyl alcohol. A second initiator chaser addition was made 30 minutes after the first initiator chaser addition. Similarly, the final initiator chaser addition was made 30 minutes after the second initiator chaser addition. The batch was then held at the polymerization temperature of 79° C. for and additional 2½ hours to achieve full conversion of monomer. At the end of the final hold, the batch was neutralized with a mixture of 42.5 gm of an aqueous 50% solution of NH$_4$OH and 450.00 gm water. The neutralized polymer solution was transferred to a roto-evaporator and stripped of solvent at ~35° C. under full house vacuum. After removing all solvent the batch was further dilution with water to ~40% polymer (PNP) in water. Particle size was measured at ~5.0 nm. The resulting aqueous PNP dispersion can be used as a dispersant for polymer latices.

EXAMPLE 20

295.3 grams of deionized water was added to a 2-liter, 4 neck round bottom flask equipped with a side arm, condenser, stirrer, and thermocouple. 160.6 grams (51.6% active in water) of ammonia neutralized acrylic acid based PNPs, pH 8–9 (70MMA/20MAA/10TMPTA, particle size less than 10 nm—prepared according to Example 19) were then added to the round bottom flask and used as a dispersant. The flask contents was heated to 85 C under a nitrogen sweep and 6.8 grams of a monomer mix consisting of 145.9 grams of styrene, 185.7 grams of 2-ethyl hexyl acrylate and 0.35 grams of butyl mercaptopropionate was added. Immediately after adding the 6.8 grams of monomer mix to the flask an ammonium persulfate solution (0.33 grams of ammonium persulfate dissolved in 3 grams of di-ionized water) was added to the flask and the contents of the flask is held at 85 C for 15 minutes. After the 15 minute hold an additional ammonium persulfate solution (1.0 gram of ammonium persulfate dissolved in 17.8 grams of water) was added to the flask and the remaining monomer mix is fed to the flask over 150 minutes. Sixty minutes into the monomer mix feed an ammonium persulfate cofeed solution (1.2 grams of ammonium persulfate dissolved in 29.9 grams of water) was added to the flask over 120 minutes. 140 minutes into the monomer mix feed the reaction temperature is increased to 87 C. Upon completion of the monomer mix feed the contents of the flask was held at 87 C for an additional 60 minutes. Afterwards, the contents of the flask was cooled to 25 C and filtered through a 100/325 mesh set of stacked screens, yielding a negligible quantity of coagulated polymer. The resulting filtered emulsion polymerization product had a solids content of 48.1%, pH 8.3, particle size of 700 nm and a viscosity of 1,340 cps.

EXAMPLES 21–31

The PNPs listed in the following table are prepared according to the method of Example 19 and are used in emulsion polymerizations according to Example 20. Utilizing PNPs of different compositions results in different particle sized latexes and variations on the improved properties they exhibit. The resulting emulsion polymers can be used for formulating coatings.

Table of PNPs Useful as Dispersants for Polymer Latices

| Example | Composition | Particle Size (nm) |
|---|---|---|
| 21 | 70 MMA/20 MAA/10 TMPTA | 10 |
| 22 | 80 MMA/10 AA/10 TMPTA | 10 |
| 23 | 75 MMA/20 AA/5 ALMA | 8 |
| 24 | 35 MMA/35 BA/20 AA/10 TMPTA | 8 |
| 25 | 30 MMA/30 BA/30 AA/10 TMPTA | 10 |
| 26 | 60 BA/30 AA/10 TMPTA | 10 |
| 27 | 20 MMA/40 2-EHA/30 AA/10 TMPTA | 10 |
| 28 | 30 Sty/30 MMA/20 AA/10 TMPTA/10 AAEM | 10 |
| 29 | 70 MMA/20 PEM/10 TMPTA | 15 |
| 30 | 20 BA/60 AA/20 TMPTA | 15 |
| 31 | 80 AA/20 TMPTA | 20 |

What is claimed is:

1. An ink comprising the dispersion, which comprises: particles having colorants and crosslinked polymeric nanoparticles ("PNPs") dispersed in a liquid medium, wherein said PNPs have a mean diameter in the range of from 1 to 15 nanometer, said PNPs comprising as polymerized units at least one multi-ethylenically-unsaturated monomer,
   wherein the colorants comprise at least one chromophore attached to at least a portion of the PNPs.

* * * * *